United States Patent Office 2,750,297
Patented June 12, 1956

2,750,297

COLD ASPHALTIC PAVING MIXTURE AND A PROCESS OF MAKING IT

Walter G. Doherty, Carmel, N. Y.

No Drawing. Application April 15, 1953,
Serial No. 349,097

2 Claims. (Cl. 106—170)

This invention relates to an improved paving composition and, more particularly, to a cold asphaltic paving composition adapted for hardening in situ without requiring mixing or the application of heat as a preliminary step before spreading the composition on any area which it is desired to surface.

A primary object of the invention is the provision of a cold asphaltic paving composition which is formulated in such a manner that it may be readily applied for surfacing any desired area without requiring mixing or the application of heat prior to its application and which nevertheless possesses such an unusual degree of stability that it may be retained for indefinite storage in waterproof paper bags or the like and may be shipped in cars, trucks or large shipping containers and employed thereafter advantageously for its intended purpose and without any impairment whatever of its desirable properties.

A further object of the invention is the provision of an improved paving composition of the character indicated which may be prepared easily and inexpensively, which is resistant to adverse conditions of use such as extremes of temperature and heavy loads and which is capable of providing an unusually strong and durable paving surface using minimum amounts of the paving composition.

An additional object of the invention is the provision of a cold asphaltic paving composition comprising mineral aggregate and asphalt emulsion as a binder wherein the mineral aggregate is treated with an additive agent such as a gelatinizer or the like in order to prevent adverse chemical reaction between the mineral aggregate and the asphalt emulsion.

I am aware that a cold paving composition may be made by the use of an emulsion and a suitable mineral aggregate without treatment in the manner of the present invention, but such compositions dry out rapidly through evaporation of the water in the emulsion and the emulsion "breaks" through chemical reaction of the mineral aggregate with the emulsion resulting in undesirable premature hardening of the composition. Furthermore, compositions of the type described cannot be placed in bags and stored for long periods or successfully shipped in bulk any great distance and then be effectively employed for road surfacing. In addition, these compositions are characterized by the considerable disadvantage that the emulsion has a pronounced tendency of "bleeding" from the mineral aggregate component.

On the contrary, the compositions of the present invention are uniquely and markedly free from the disadvantages indicated and possess characteristics eminently adapting them for effective use as long-storage, cold asphaltic paving mixtures.

The foregoing objects and advantages as well as additional objects and advantages of the invention are achieved in a startlingly simple manner. Suitable mineral aggregate such as crushed stone, gravel or sand, wet or dry, serves as the base of the paving composition. The mineral aggregate is treated in a suitable mixer with a relatively small amount of a dry additive agent adapted for protecting the particles of mineral aggregate against adverse chemical reaction between the mineral aggregate and the asphalt emulsion. In addition, the additive agent must have the property of serving as a protective colloid in the presence of the water-external phase of the asphalt emulsion in order to prevent adsorption of water by the particles of the mineral aggregate. It is essential for the purposes of the invention that the mineral aggregate be initially treated with the dry additive agent or gelatinizer prior to the addition of the asphalt emulsion. I have found that the following additive agents or gelatinizing agents are particularly suitable for the purposes of the invention: methyl cellulose and ethyl cellulose.

The described treatment of the invention causes a thickening or stiffening of the emulsion of the composition so that when worked and rolled, the coated mineral aggregate particles have extremely great adhesion to each other and after rolling are much more resistant to wash-out from sudden heavy rains than has been possible heretofore. The treatment also has the considerable advantage of holding the emulsion to the mineral aggregate without adverse chemical effect while preventing run-off or bleeding during storage and transportation of the prepared compositions.

The following examples are given as illustrative of the practice of the invention and without intending to limit the invention thereto:

*Example 1*

| | Per cent |
|---|---|
| Mineral aggregate graded from ¾″ to dust | 89.5 |
| Asphalt emulsion | 9.0 |
| Water | 1.5 |
| Methyl cellulose | 0.01 |

*Example 2*

| | Per cent |
|---|---|
| Mineral aggregate graded from ⅜″ to dust | 88.0 |
| Asphalt emulsion | 10.0 |
| Water | 2.0 |
| Methyl cellulose | 0.01 |

*Example 3*

| | Per cent |
|---|---|
| Mineral aggregate graded from 3/16″ to dust | 85.5 |
| Asphalt emulsion | 12.0 |
| Water | 2.5 |
| Methyl cellulose | 0.01 |

*Eample 4*

| | Per cent |
|---|---|
| Mineral aggregate graded from ¾″ to dust | 89.45 |
| Asphalt emulsion | 9.00 |
| Water | 1.50 |
| Ethyl cellulose | 0.05 |

*Example 5*

| | Per cent |
|---|---|
| Mineral aggregate graded from 3/16″ to dust | 85.45 |
| Asphalt emulsion | 12.0 |
| Water | 2.5 |
| Ethyl cellulose | 0.05 |

The foregoing examples are illustrative of the practice of the present invention and indicate various substances which may be employed as additive agents for treating the mineral aggregate prior to the incorporation of the asphalt emulsion in the paving composition.

It is emphasized that the additive agents which are suitable for the purposes of the invention, i. e. the preliminary coating of the mineral aggregate in order to prevent adverse chemical reaction between the mineral aggregate and the asphalt emulsion and to simultaneously prevent adsorption of water from the emulsion by the particles of mineral aggregate, are substances which are capable of acting as a protective colloid with respect to the mineral aggregate particles in the presence of water. The two-fold advantage of employing such substances is, as has been previously described, to prevent breaking or bleeding of the asphalt emulsion from the mineral aggregate as a result of chemical action between the mineral aggregate and the asphalt emulsion, and/or adsorption of water by the mineral aggregate particles.

Since certain modifications may be made in the compositions of the present invention without departing from the scope thereof, it is intended that all matter contained in the foregoing specification be interpreted merely as illustrative and not in a limiting sense.

What is claimed is:

1. A cold hardening asphaltic paving composition consisting of mineral aggregate, an asphaltic emulsion adapted to bind the aggregate, and a separate protective colloid producing water-soluble substance selected from the group consisting of methyl cellulose and ethyl cellulose.

2. The process of making a stable asphaltic paving composition which consists in mixing an aggregate and a water-soluble protective dry colloid, and thereafter mixing with the aggregate an emulsified asphalt adapted to serve as a binder when the asphalt composition is rolled out on a solid surface.

References Cited in the file of this patent

UNITED STATES PATENTS

| | | |
|---|---|---|
| 604,181 | Walker | May 17, 1898 |
| 956,009 | Westrum | Apr. 26, 1910 |
| 2,205,438 | Richter | June 25, 1940 |
| 2,393,022 | Clark | Jan. 15, 1946 |
| 2,409,258 | Davis | Oct. 15, 1946 |

FOREIGN PATENTS

| | | |
|---|---|---|
| 258,870 | Great Britain | June 16, 1927 |
| 304,114 | Great Britain | July 4, 1928 |